US010028868B2

(12) United States Patent
Naber et al.

(10) Patent No.: US 10,028,868 B2
(45) Date of Patent: Jul. 24, 2018

(54) LOADING AND UNLOADING APPARATUS

(71) Applicant: Stryker Corporation, Kalamazoo, MI (US)

(72) Inventors: Brandon David Naber, Portage, MI (US); Clifford Edwin Lambarth, Portage, MI (US); Jason James Wroblewski, Kalamazoo, MI (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

(21) Appl. No.: 15/314,173

(22) PCT Filed: Jun. 24, 2015

(86) PCT No.: PCT/US2015/037420
§ 371 (c)(1),
(2) Date: Nov. 28, 2016

(87) PCT Pub. No.: WO2016/007290
PCT Pub. Date: Jan. 14, 2016

(65) Prior Publication Data
US 2017/0100289 A1      Apr. 13, 2017

Related U.S. Application Data

(60) Provisional application No. 62/021,846, filed on Jul. 8, 2014.

(51) Int. Cl.
*A61G 1/00*     (2006.01)
*A61G 3/02*     (2006.01)
(Continued)

(52) U.S. Cl.
CPC ............. *A61G 3/0272* (2013.01); *A61G 1/02* (2013.01); *A61G 1/0262* (2013.01); *A61G 1/06* (2013.01);
(Continued)

(58) Field of Classification Search
CPC ...... A61G 1/00; A61G 1/0272; A61G 1/0212; A61G 1/02; A61G 1/029; A61G 1/0236
See application file for complete search history.

(56) References Cited

U.S. PATENT DOCUMENTS 5,806,111 A  *  9/1998  Heimbrock .......... A61G 1/0225
                                                         280/47.371
6,332,638 B1 * 12/2001  Menna ................. A61G 1/0565
                                                         296/20
(Continued)

FOREIGN PATENT DOCUMENTS

EP      2366369 A2 *  9/2011    ............... A61G 3/02
GB      2366782 A  *  3/2002    ............... A61G 3/02
(Continued)

*Primary Examiner* — Kaitlin S Joerger
(74) *Attorney, Agent, or Firm* — Warner Norcross + Judd LLP

(57) ABSTRACT

A patient transport loading and unloading apparatus for an emergency vehicle includes at least one support configured for mounting at the access opening of the vehicle and a stationary mount. The support is deployable relative to the stationary mount between a stowed position (in which the support cannot support the patient transport apparatus) and a loading position. Further, the support is configured to remain stationary when the patient transport apparatus is loaded onto the support and while the patient transport apparatus is moved into the vehicle through the access opening.

26 Claims, 5 Drawing Sheets

(51) Int. Cl.
*A61G 1/06* (2006.01)
*A61G 1/02* (2006.01)
*B60P 7/08* (2006.01)
*B60P 1/00* (2006.01)

(52) U.S. Cl.
CPC .............. *A61G 3/0236* (2013.01); *B60P 1/00* (2013.01); *B60P 7/08* (2013.01)

(56) References Cited

U.S. PATENT DOCUMENTS

| | | | |
|---|---|---|---|
| 6,735,794 B1 * | 5/2004 | Way | A61G 1/0293 16/35 R |
| 6,916,056 B2 * | 7/2005 | Mitchell | A61G 1/0567 296/20 |
| 7,306,421 B2 | 12/2007 | Wolfe | |
| 7,478,855 B2 * | 1/2009 | Lambarth | A61G 1/0567 296/19 |
| 7,637,550 B2 * | 12/2009 | Menna | A61G 1/013 296/19 |
| 7,775,574 B2 * | 8/2010 | Matunaga | A61G 1/017 296/20 |
| 7,887,113 B2 * | 2/2011 | Lambarth | A61G 1/0212 296/20 |
| 8,056,950 B2 | 11/2011 | Souke et al. | |
| 8,439,416 B2 * | 5/2013 | Lambarth | A61G 1/02 296/20 |
| 8,444,195 B2 * | 5/2013 | Bourgraf | B60P 1/003 296/20 |
| 8,689,372 B2 * | 4/2014 | Heimbrock | A61G 7/0507 5/424 |
| 8,714,504 B2 * | 5/2014 | Vuorenoja | A61G 1/06 248/285.1 |
| 8,820,812 B2 * | 9/2014 | Menna | A61G 3/0245 296/19 |
| 8,973,963 B2 | 3/2015 | Lambarth et al. | |
| 9,205,009 B2 * | 12/2015 | Koors | A61G 7/08 |
| 9,364,376 B2 * | 6/2016 | Crawford | A61G 3/0236 |
| 9,545,345 B1 * | 1/2017 | Akers, Jr. | A61G 3/0272 |
| 2016/0338887 A1 * | 11/2016 | Naber | A61G 3/0272 |

FOREIGN PATENT DOCUMENTS

| | | |
|---|---|---|
| WO | 0200466 A1 | 1/2002 |
| WO | 2006003385 A1 | 1/2006 |

\* cited by examiner

LOADING AND UNLOADING APPARATUS

TECHNICAL FIELD AND BACKGROUND OF THE INVENTION

The present invention relates to a loading and unloading apparatus for use in an emergency vehicle.

When handling invalids or injured persons, caregivers often use a transport apparatus, such as a cot, stretcher, chair, or the like, to transport a patient from a first location to a second location. Often times, however, a caregiver may be required to then transfer the patient to a vehicle, such as an ambulance, airplane, or the like. In most cases, the patient is transferred to the vehicle on the transport apparatus. While loading and unloading apparatuses exist for loading transport apparatuses into vehicles, current loading and unloading apparatuses are often complicated.

SUMMARY OF THE INVENTION

Accordingly, a simplified loading and unloading apparatus is described that facilitates the loading and unloading of transport apparatuses into a vehicle.

In one embodiment, a patent transport loading and unloading apparatus for an emergency vehicle includes at least one support configured for mounting at or near the access opening of the emergency vehicle and a stationary mount. The support is deployable relative to the stationary mount between a stowed position and a loading position. Further, the support is configured to support a patient transport apparatus when in its deployed position and remain generally stationary in its deployed position while the patient transport apparatus is loaded onto the support and into the patient compartment from the support.

In one aspect, the patient transport loading and unloading apparatus further includes a base, which includes the stationary mount and which is adapted to mount to the floor of the patient compartment. For example, the base may comprise a pair of spaced apart rails, with the support comprising a pair of spaced apart arms that are configured to move relative to the rails. Optionally, the base may include a latch for anchoring the patient transport apparatus.

In a further aspect, the rails define a space there between in which the patient transport apparatus may be passed through when the patient transported apparatus is being loaded into the patient compartment.

In yet another aspect, the support is pivotal relative to the stationary mount.

According to yet another aspect, the support comprises a pair of spaced apart arms, which define a receiving space there between for receiving a patient support apparatus.

For example, each of the arms may include a guide surface on which the patient transport apparatus may be guided when at least a portion of the patient transport apparatus is moved into the receiving space.

In a further aspect, the guide surfaces comprise recessed guide surfaces. Each of the recessed guide surfaces may have a stop to limit movement of the patient transport along the arms. Optionally, each stop may comprise a spring biased pawl. In yet a further aspect, each of the arms includes a distal end with the stop located at or adjacent to the distal end.

According to yet another embodiment, a patient transport loading and unloading system for a transport vehicle includes a patient transport apparatus having a patient support surface, a frame for supporting the patient support surface, and a base movable relative to the frame. The system further includes a patient transport loading and unloading apparatus, which includes a support configured for mounting at or near the access opening of the vehicle. The system further includes a stationary mount. The support is movable relative to the stationary mount between a stowed position and a deployed, loading position. When in the deployed position, the support has a support surface at a support height for supporting the patient transport apparatus thereon when the frame is at the support height and aligned with the support surface. The support remains in the loading position while the patient transport apparatus is moved in the vehicle through the access opening.

Further, when the patient support apparatus is supported on the support surface, the support is configured to allow the base of the patient support apparatus to raise relative to the frame without interference from the support.

In one aspect, the support comprises a pair of spaced apart arms, which define a receiving space there between for receiving the patient support apparatus. The arms may form a pair of the support surfaces, with the patient transport apparatus including a pair of support points outward of the frame for resting on the pair of arms and thereby supporting the patient transport apparatus on the arms.

In another aspect, the patient transport apparatus includes a pair of couplers defining the support points for supporting the patient transport apparatus on the arms. For example, the frame may include the couplers that form the support points. Furthermore, each of the couplers may be movable between a stowed position and a deployed position for engaging a respective arm of the arms. For example, each of the couplers may be retracted into the frame when moved to its stowed position.

In yet a further aspect, the couplers may be movable to raise or lower the support points.

Optionally, the frame of the patient transport apparatus has a transverse width, and the support has a pair of arms spaced apart a distance greater than the width of the frame.

In a further aspect, the support is moved in a generally horizontal position when moved to its deployed position. For example, the support may be cantilevered from the stationary mount when moved to its deployed position.

According to yet another aspect, the patient transport apparatus includes a lift mechanism for moving the frame relative to the base or moving the base relative to the frame. Further, the support is configured to allow the lift mechanism to move either the frame or the base without interference from the support when the patient transport apparatus is supported by the support.

Optionally, the support may be pivotally mounted to the stationary mount about a horizontal axis wherein the support moves to a raised position when moved to its stowed position. When in its stowed position, the support may form a restraint for the patient support in at least one direction when the patient transport apparatus is loaded into the vehicle compartment.

In a further aspect, the support includes a releasable coupler when in the stowed position for selectively engaging the patient transport apparatus thereby forming a restraint for the patient transport apparatus in at least two directions.

Further, in any of the above systems, the system may include a latch for anchoring the patient transport apparatus in the vehicle. In addition, the system may include a base for the stationary mount formed on or mounted to the base, with the latch formed on or mounted to the base.

In any of the above apparatuses or systems, the support may comprise a primary support and the apparatus or system further may include an auxiliary support for supporting the distal end of the primary support. Optionally the auxiliary support is selectively movable between a stowed position and a deployed position wherein the auxiliary support can support the distal end of the primary support when in its deployed position.

According to yet another embodiment, a vehicle for transporting a patient transport apparatus includes a compartment having at least one door defining an access opening when moved to an open position. A patient transport loading and unloading apparatus is mounted in the compartment, with the patient transport loading and unloading apparatus including at least one support configured for deployment from the access opening when the door is in its open position. The vehicle further includes a stationary mount secured in the compartment at or adjacent in the access opening. The support is configured to move relative to the stationary mount so that it is movable between a stowed position inside the compartment and a deployed, loading position wherein at least a portion of the support is extended from the access opening. When in the loading position, the support provides a stationary surface for supporting a patient transport apparatus when the patient transport apparatus is moved onto the support and across which the patient transport apparatus moves when loaded into the compartment.

In one aspect, the support is coupled to the door and is configured to automatically deploy when the door is moved to its open position.

In another aspect, the support is pivotally mounted to the stationary mount about a fixed horizontal pivot axis wherein the support moves to a raised position when moved to its stowed position. For example, the support may be moved to a generally horizontal position when pivoted to its deployed position. Further, the support may be cantilevered from the stationary mount when in its deployed position.

According to yet another aspect, the support is pivotally mounted to the stationary mount about a horizontal axis wherein the support moves to a raised position (when moved to its stowed position), and when in a stowed position, the support forms a restraint for the patient support at least in one direction.

According to yet another aspect, the vehicle further includes a releasable coupler when in the stowed position for selectively engaging the patient transport apparatus to thereby form a restraint for the patient transport apparatus in at least two directions.

In any of the above vehicles, the vehicle may further include a latch for anchoring the patient transport apparatus in the compartment.

Further, in any of the above vehicles, the support comprises a primary support, and the loading and unloading apparatus further includes an auxiliary support for supporting the primary support. Optionally, the auxiliary support is selectively movable between a stowed position and a deployed position wherein the auxiliary support supports the distal end of the primary support.

Furthermore, the support optionally includes a guide surface at a distal end thereof to facilitate the loading of the patient transport apparatus on to the support, such as a ramped guide surface.

According to yet another embodiment, a method of loading a patient transport apparatus into a compartment through an access opening of a vehicle includes deploying a support from the access opening, which includes moving the support from a stowed position in which the support cannot support a patient transport apparatus to a loading position where the support can support a patient transport apparatus. The patient transport apparatus is then moved toward the support. After the patient transport apparatus is moved onto the support, the patient transport apparatus is supported on the support. The patient transport apparatus is then moved relative to the support into the compartment. After the patient transport apparatus is moved into the compartment, then the support can be returned to its stowed position.

In one aspect, the method further includes moving a portion of the patient transport apparatus to a loading height and moving the patient transport apparatus on the support when the portion is moved to the loading height.

In another aspect, the method further includes collapsing a portion of the patient transport apparatus after the patient transport apparatus is supported by the support.

Accordingly, the patient transport loading and unloading apparatus can provide a simplified system for loading or unloading a patient transport apparatus to or from a vehicle.

DETAILED DESCRIPTION OF THE PREFERRED EMBODIMENTS

Figure 1:
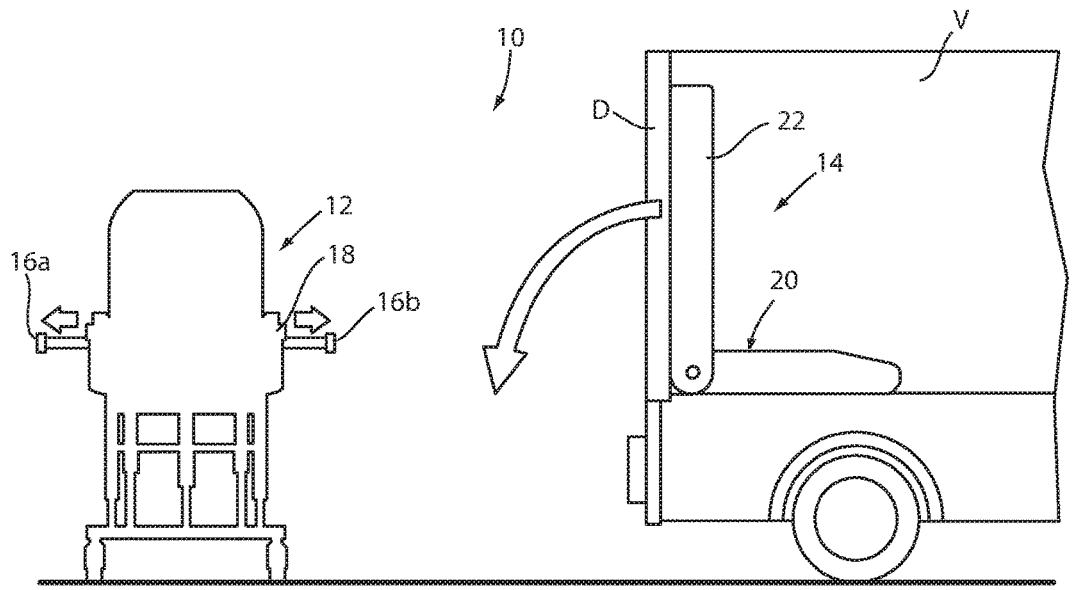
FIG. 1 is an elevation view of a patient transport position adjacent to a vehicle.

Referring to FIG. 1, the numeral 10 generally designates a patient transport loading and unloading system. System 10 includes a patient transport apparatus 12 and a patient transport loading and unloading apparatus 14, which is configured for mounting in a vehicle V for loading or unloading patient transport apparatus 12 into the vehicle. As will be more fully described below, loading and unloading apparatus 14 includes a stationary mount 20 and a movable support 22 that is movable about the stationary mount from a stowed position to a deployed, loading position and may be configured to occupy less space than current loading and unloading apparatus designs. Further, as will be more fully described below, support 22 remains generally stationary when in its deployed, loading position while loading or unloading patient transport apparatus 12 into or from the vehicle so that patient transport apparatus 12 translates across support 22 when being loaded or unloaded.

Referring again to FIG. 1, in the illustrated embodiment, patient transport apparatus 12 comprises an emergency cot. For example a suitable emergency cot, reference is made herein to U.S. Pat. No. 7,398,571, which is commonly owned by Stryker Corporation, Kalamazoo, Mich., which is incorporated by reference herein in its entirety. Patient transport apparatus 12 optionally includes pair of support points 16a and 16b, which are mounted to frame 18 of apparatus 12, which provide support or engagement points for apparatus 12 when loaded onto apparatus 14. Optionally, support points 16a, 16b are movably mounted to apparatus 12 so they can be moved from a stowed position, for example within frame 18 of apparatus 12, to a support position, such as shown in FIG. 1, to provide engagement points for apparatus 14.

Figure 2:
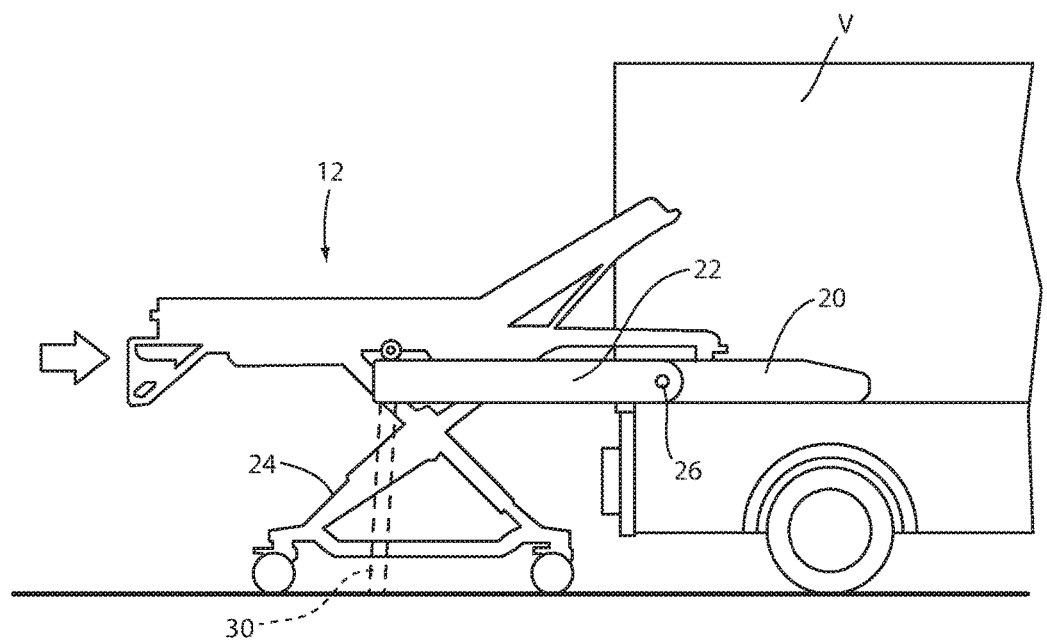
FIG. 2 is a side elevation view of the patient transport being loaded onto the patient transport loading and unloading apparatus which is deployed from a stowed position to its deployed, loading position.

As best understood from FIGS. 1 and 2, movable support 22 is configured and arranged to move relative to stationary mount 20, for example, about a fixed point of articulation. Support 22 is moved about stationary mount 20 from its stowed position (shown in FIG. 1) to its deployed, loading position (shown in FIG. 2) so that patient transport apparatus 12 can be loaded onto support 22 when in its deployed position to facilitate loading of patient transport apparatus 12 into vehicle V.

In the illustrated embodiment, support 22 is pivotally mounted about a fixed pivot axis at stationary mount 20 so it pivots from a generally vertical orientation, such as shown in FIG. 1, to a generally horizontal orientation, such as shown in FIG. 2. When moved to its deployed position (such as shown in FIG. 2), support 22 remains generally stationary so that patient transport apparatus 12 may be pushed on support 22 so that it can be supported by support 22 and then translated along support 22 to move into the vehicle compartment. In this manner, support 22 and apparatus 12 are decoupled.

As noted above, patient transport apparatus 12 may be configured as an emergency cot. Further, suitable transport apparatuses may include an emergency cot with a lift mechanism for lifting or lowering the frame of the cot (which supports the litter deck) relative to its base and/or plurality of bearings. When configured as an emergency cot, support 22 may be configured to support patient transport apparatus 12 in manner to allow its base to be raised relative to its litter deck so that patient transport apparatus 12 can assume a more compact configuration for insertion into the vehicle.

In the illustrated embodiment, support 22 includes a receiving space 22c (FIG. 2A) for receiving patient transport apparatus 12, with support 22 configured to support patient transport apparatus 12 when support patient transport apparatus 12 is moved into receiving space. Receiving space 22c is free of any structure that would interfere with the lifting of the base of patient transport apparatus 12 (relative to its litter) so that when patient transport apparatus 12 is moved into receiving space and the frame of patient transport apparatus 12 is then supported by support 22, the base of patient transport apparatus 12 may be raised.

Figure 2A:
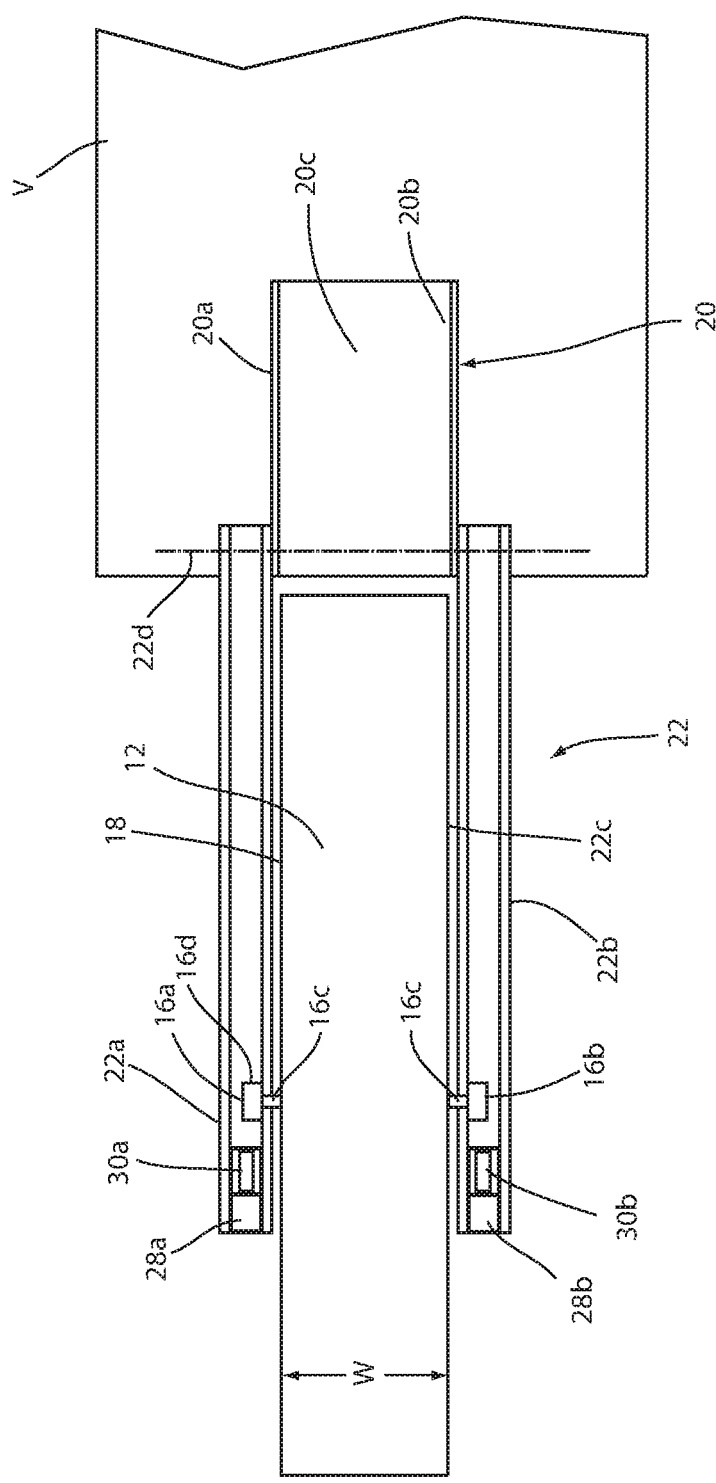
FIG. 2A is a plan view of the loading and unloading system.

Referring to FIG. 2A, support 22 may include a pair of elongated arms 22a and 22b, which are spaced apart to define receiving space 22c there between for receiving patient transport apparatus 12. Further, arms 22a and 22b may be spaced such that the distance between the respective inner facing surfaces of the arms (22a, 22b) is greater than the width W of patient support apparatus frame 18 so that when patient transport apparatus 12 is located between arms 22a and 22b there may be a gap on either side of apparatus 12 and arms 22a, 22b. Arms 22a and 22b, however, are spaced closely enough so that they can each provide a support surface for the support points 16a, 16b of patient transport apparatus 12. In this manner, when patient transport apparatus 12 is moved between respective arms 22a and 22b and frame 18 is lowered, support points 16, 16b can rest on arms 22a and 22b to support patient transport apparatus 12 thereon.

For example, support points 16a, 16b may be provided by couplers that are formed by shafts which extend from frame 18 of transport apparatus 12 and further include a wheel or bearing 16d mounted to the distal end of the respective shaft so that patient transport apparatus 12 may be rolled or slid along the respective arms. The number of support points may vary. For example, as shown, the patient transport apparatus 12 may include a single pair of support points 16a, 16b. However, it should be understood that patient transport apparatus 12 may include two more pairs of support points. Furthermore, the location of the support points may vary. For example, support points 16a, 16b may be located midway along the length of the patient transport apparatus and may, for example, be located generally at the center of gravity of the patient transport apparatus to provide enhanced stability.

Referring to FIG. 1, as noted above, patient support points 16a and 16b may be movably mounted with respect to frame 18. For example, the supports may be retracted into the frame. When formed from a shaft and a wheel or bearing, as described above, each shaft may be received in a tubular member formed as part of, or mounted, to frame 18, with the wheel or bearing abutting end of the tubular member when the support points are retracted so that at least most of the support point is retracted into the frame. The tubes may include an enlarged end (e.g. a stepped profile) to receive the respective bearing members so that the couplers are fully retraced into the frame. Alternately, the couplers may be hinged to the frame so they fold against the frame when moved to their stowed positions.

Referring to FIGS. 2 and 2A, when loading patient transport apparatus 12 into the vehicle, support 22 is moved from its stowed position to its deployed position. When patient transport apparatus 12 is pushed towards the vehicle between arms 22a and 22b, the head end of the patient transport apparatus 12 is inserted into the rear access opening of the vehicle, and optionally supported by a head end wheel or bearing attached to the transport apparatus. After support 22 is in its deployed position and patient transport apparatus is supported on arms 22a, 22b, the patient transport apparatus can then be collapsed (e.g. bearings or base raised) so that patient transport apparatus 12 can then be pushed into the vehicle between arms 22a and 22b. The support points 16a and 16b may be deployed and moved from their stowed position to their support positions for supporting patient transport apparatus 12 on support 22 either prior to or after the patient transport apparatus is located between arms 22a, 22b.

Figure 3:
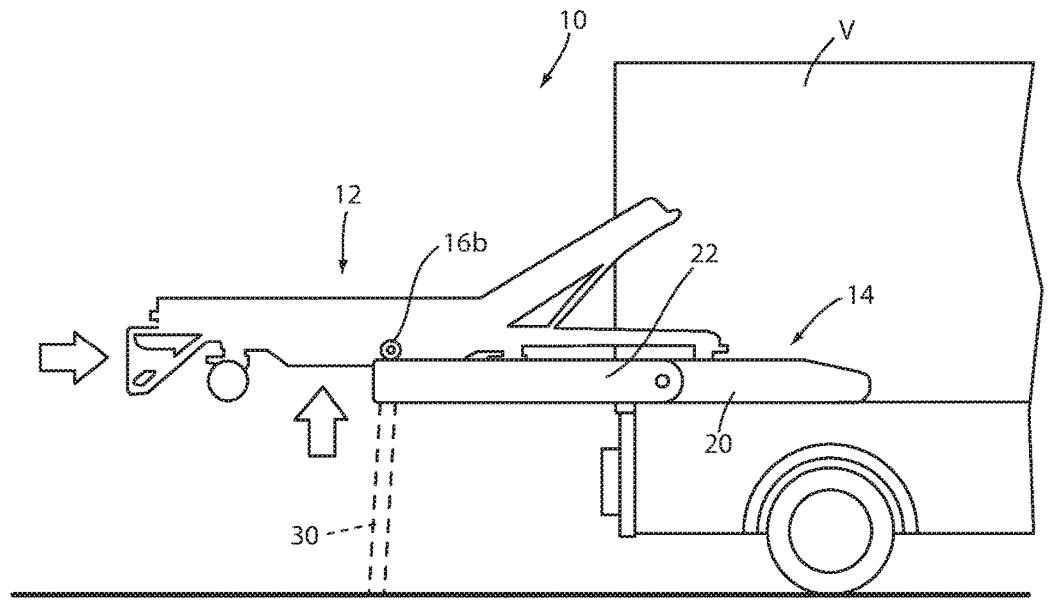
FIG. 3 is a similar view to FIG. 2 illustrating the patient transport apparatus supported by the loading and unloading apparatus and further with the bearings of the patient transport raised to a compact configuration.
Figure 4:
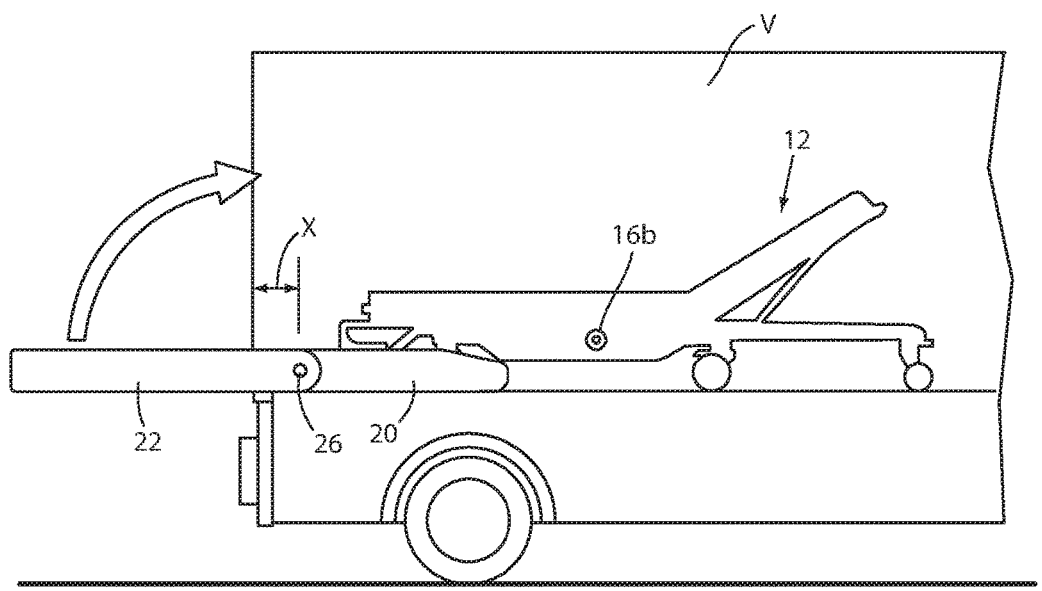
FIG. 4 to similar view of FIG. 3 illustrating the patient transport fully inserted into the vehicle.

The height of patient transport apparatus 12 may be maintained (e.g. by way of its lifting mechanism) such that support points 16a and 16b are above or at the height of the upper surfaces of the respective arms 22a and 22b so that when patient transport apparatus 12 is pushed between respective arms 22a and 22b, support points 16a and 16b are either above the arms or aligned with the upper surfaces of arms 22a, 22b. When aligned and bearings are provided, apparatus 12 may then be rolled or slid on the respective arms so that the head end of patient transport apparatus can be pushed into the access opening of vehicle V. As would be understood, depending on the height of patient transport apparatus 12 when loaded onto support 22, the height of the frame may be lowered so that the support points 16a and 16b make contact with the respective arms after apparatus 12 is fully inserted between the respective arms. Once support points 16a and 16b are in contact the respective arms, the base 24 of patient transport apparatus 12 may be raised so that patient transport apparatus 12 may be fully inserted into the vehicle such as shown in FIGS. 3 and 4.

Once the patient transport apparatus 12 is fully inserted into the vehicle, support 22 may then be moved to its stowed position. Optionally, support 22 may provide a barrier or stop for the patient transport apparatus to prevent patient transport apparatus 12 from moving towards the door when loaded in the vehicle and optionally prevent the patient transport apparatus from moving.

As noted above, loading or unloading apparatus 14 includes stationary mount 20. Stationary mount 20 may comprise a pair of rails 20a, 20b, which are parallel and mounted to the floor of the patient compartment either directly or by a base. For example, rails 20a and 20b may be formed by a channel shape member with the web 20c of channel shaped member, which mounts to the floor of the vehicle compartment, having a relative low profile to allow the patient transport apparatus 12 to be rolled over the web between respective flanges of the channel shaped member, which form rails 20a and 20b. Alternately, rails 20a and 20b may not have any interconnecting structure.

In the illustrated embodiment, as described above, support 22 is pivotally mounted to stationary mount 20. Referring again to FIG. 2A, arms 22a and 22b are pivotally mounted about a fixed pivot axis 22d by pivot shafts 26 mounted to respective rails 20a, 20b. Pivot axis 22d is generally horizontal so that rotation of arms 22a and 22b about axis 22d induces arcuate motion of support 22 when moved between its deployed position (in which arms 22a and 22b are generally horizontal) and its stowed position (where support 22 is in a generally vertical position). Further in the illustrated embodiment, rotational pivot axis 22d is mounted inwardly of the back of vehicle V a distance X for example a range of 1 inch to 15 inches. In this manner, when support 22 is pivoted to its stowed position, support 22 will be generally vertical and may be immediately adjacent door D when door D is closed so that the door can act as a lateral support for arms 22a and 22b. Thus, support 22 is movable relative to the stationary mount about a vertically and horizontally fixed pivot axis. Further, support 22 is cantilevered from its stationary mount when moved to its deployed position.

Referring again to FIG. 2A, arms 22a and 22b may each comprise a channel shaped member with a pair of upwardly extending flanges and a central web, which defines a guide surface at the upper surfaces 22a' and 22b' of each arm. Each central web may include angle surfaces 28a and 28b to form ramps to facilitate loading of the patient transport apparatus onto arms 22a and 22b, for example, when the height of apparatus 12 is such that support points 16a, 16b are generally at the same height as the upper surfaces 22a' and 22b' of arms 22a, 22b. The length of the ramps may vary. Additionally, arms 22a and 22b may incorporate a stop adjacent or at the end of the respective arms to prevent the patient transport apparatus 12 from rolling off or sliding off the respective arms once it is loaded on the arms. For example, a suitable stop may include a spring biased pawl that is mounted for example adjacent or at the distal end of the respective arms or adjacent, including immediately adjacent, the ends of the ramps surfaces 28a, 28b (such as shown in FIG. 2A).

Figure 5:
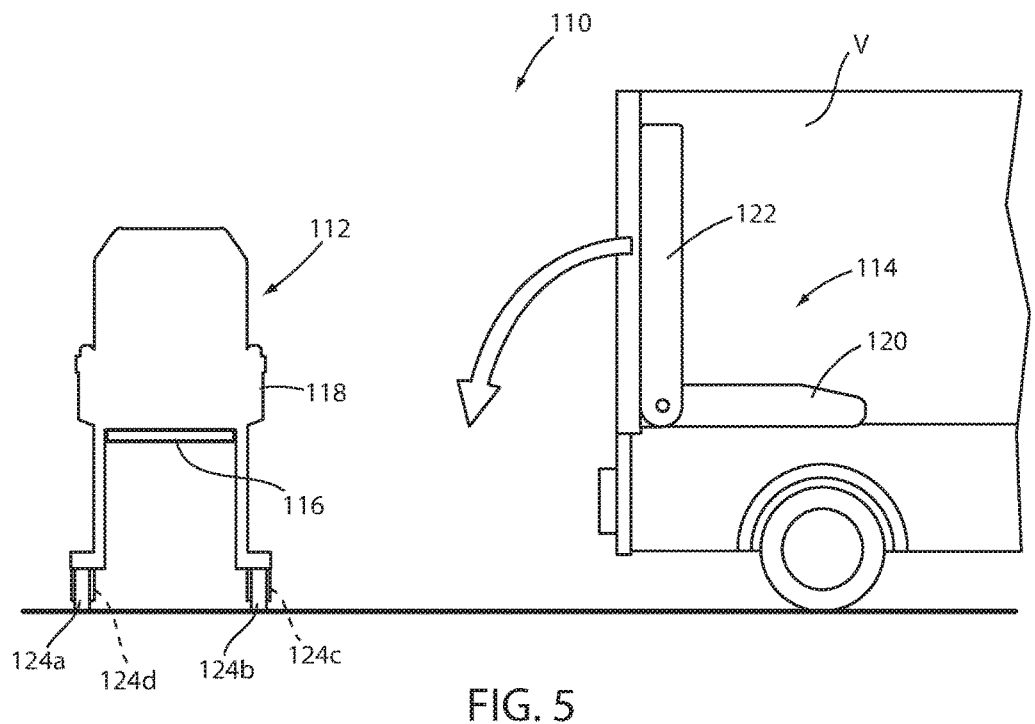
FIG. 5 is an elevation view of another embodiment of a patient transport position adjacent to a vehicle.
Figure 6:
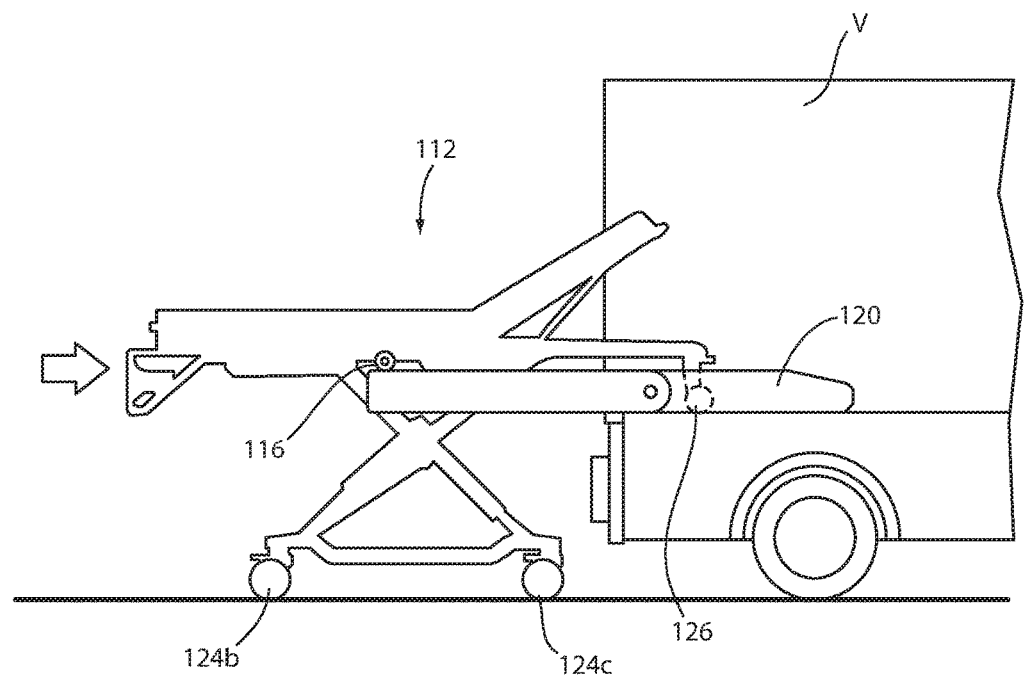
FIG. 6 is a side elevation view of the patient transport being loaded onto the patient transport loading and unloading apparatus which is deployed from a stowed position to its deployed, loading position.

Referring to FIG. 5, the numeral 110 designates another embodiment of a patient transport loading and unloading system, which similarly includes a patient transport apparatus 112 and a patient transport loading and unloading apparatus 114. In the illustrated embodiment, patient transport apparatus 112 also comprises an emergency cot but without a central base frame, so that the base is defined by four bearing members 124a-124d.

Similar to the previous embodiment, loading and unloading apparatus 114 includes a stationary mount 120 and a movable support 122 that is movable about the stationary mount from a stowed position to a deployed, loading position. Also similar to the previous embodiment, support 122 remains generally stationary when in its deployed, loading position while loading or unloading patient transport apparatus 112 into or from the vehicle so that patient transport apparatus 112 translates across support 122 when being loaded or unloaded.

Figure 7:
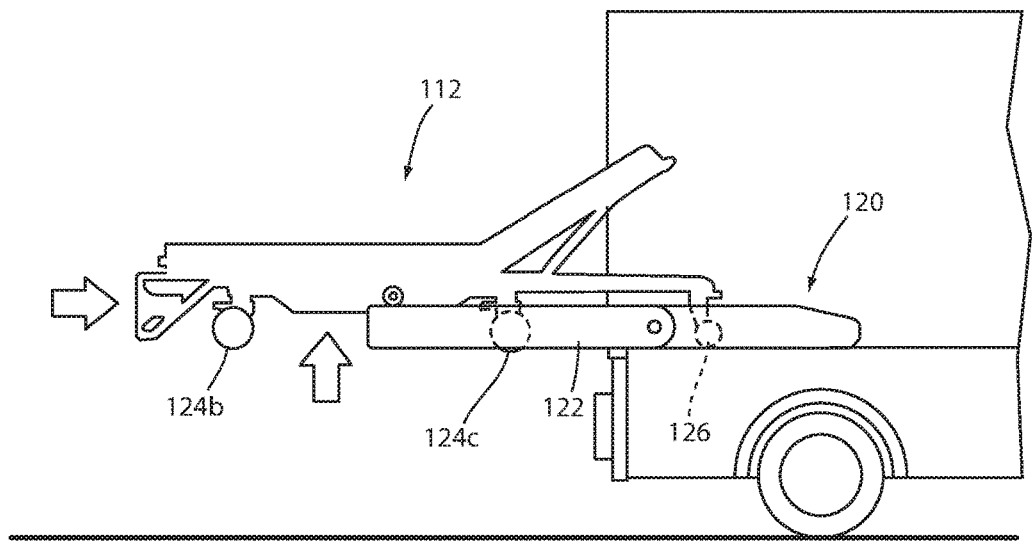
FIG. 7 is a similar view to FIG. 6 illustrating the patient transport apparatus supported by the loading and unloading apparatus and further with the bearings of the patient transport raised to a compact configuration.
Figure 8:
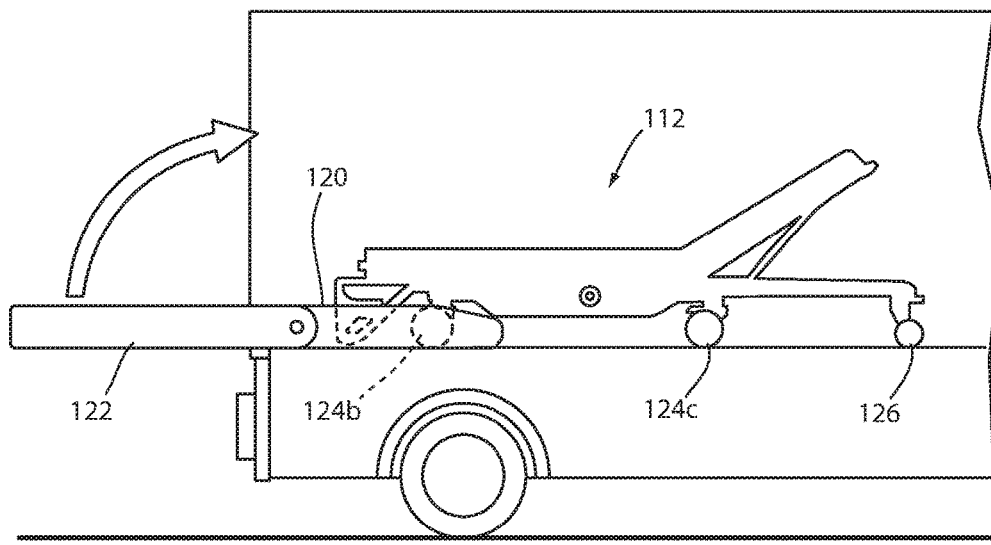
FIG. 8 to similar view of FIG. 6 illustrating the patient transport apparatus fully inserted into the vehicle.

As best understood from FIGS. 8-10, movable support 122 is configured and arranged to move relative to stationary mount 120, for example, about a fixed point of articulation. Support 122 is moved about stationary mount 20 from its stowed position (shown in FIG. 7) to its deployed, loading position (shown in FIG. 8) so that patient transport apparatus 112 can be loaded onto support 212 when in its deployed position to facilitate loading of patient transport apparatus 112 into vehicle V.

In the illustrated embodiment, support 122 comprises a single arm that extends into patient transport apparatus 112 beneath frame 118 but between bearings 124a-124d so that it does not interfere with the raising of the base. Similar to support 22, when moved to its deployed position (such as shown in FIG. 8), support 122 remains generally stationary so that patient transport apparatus 112 may be pushed on support 122 so that it can be supported by support 122 and then translated along support 122 to move into the vehicle compartment.

Optionally, transport apparatus 112 may include at least one support point 116 which bears on support 122. To facilitate loading and unloading of transport apparatus 112, transport apparatus 112 may include a roller or a low friction rail that forms support point 116, which is support by frame 118 so that patient transport apparatus 112 may be rolled or slid along support 122. For example, a suitable low friction rail may comprise or include an ultra-high density polyethylene material. A suitable arm for support 122 may include an I-beam or a tubular member, for example.

Referring to FIGS. 9 and 10, prior to loading patient transport apparatus 112 into the vehicle, support 122 is moved from its stowed position to its deployed position. When patient transport apparatus 112 is pushed towards the vehicle onto support 122, the head end of the patient transport apparatus 112 is inserted into the rear access opening of the vehicle, and optionally supported by one or more head end wheels or bearings 126 attached to the transport apparatus. After support 122 is in its deployed position and patient transport apparatus is supported, the patient transport apparatus can then be collapsed (e.g. bearings or base raised) so that patient transport apparatus 112 has a more compact configuration and can then be pushed into the vehicle on bearings 124a-124d, which straddle support 122.

The height of patient transport apparatus 112 may be maintained (e.g. by way of its lifting mechanism) such that support point 116 is at the height of the upper surfaces of the support 122 so that when patient transport apparatus 112 is pushed onto support 122, support point 116 can rest on the upper surface of support 122 and thereafter be pushed into the vehicle. When support point 116 is above the height of the upper surfaces of the support 122, apparatus 112 can be lowered and then be rolled or slid on the support so that patient transport apparatus can be translated across support and pushed into the access opening of vehicle V. Once the patient transport apparatus 112 is fully inserted into the vehicle, support 122 may then be moved to its stowed position. Optionally, support 122 may form a barrier to provide a stop for the patient transport apparatus to prevent patient transport apparatus 12 from moving towards the door when loaded in the vehicle, and optionally prevent the patient transport apparatus from moving. Further, as noted above, support 122 may be coupled to the door or doors of the vehicle, which may be configured to automatically deploy or store when the door(s) is opened or closed.

As noted above, loading or unloading apparatus 114 includes stationary mount 120. Stationary mount 120 is also sized so that it can pass between the bearings 124a-124d of apparatus 112 so that apparatus 112 can be rolled over mount 120.

Similar to system 10, support 122 may be pivotally mounted to stationary mount 120 about a fixed pivot axis, formed for example, by pivot shafts mounted to stationary mount. Support 122, therefore, moves in a similar arcuate path when moved between its deployed position (in which support 122 is generally horizontal) and its stowed position (where support 122 is in a generally vertical position). Further in the illustrated embodiment, the rotational pivot axis is similarly mounted inwardly of the back of vehicle V a distance X for example a range of 1 inch to 15 inches. In this manner, when support 122 is pivoted to its stowed position, support 122 will be generally vertical and may be immediately adjacent door D when door D is closed so that the door acts as a lateral restrain at least in one direction for support 122. Thus, support 122 is movable relative to the stationary mount about a vertically and horizontally fixed pivot axis. Further, support 122 may be cantilevered from its stationary mount when moved to its deployed position.

When patient transfer apparatus 112 is loaded into the vehicle, patient transfer apparatus 112 may be anchored in the vehicle by a fastener or latch anchoring the patient transport apparatus in the vehicle during transport, such as described above.

Alternately, any of the supports may be mounted to their stationary mounts by a four-bar linkage or the like which provides deployment of the support relative to the stationary mount about one or more fixed points of articulation from its stowed position inside the vehicle to its deployed position outside the vehicle to allow the patient transport apparatus to be loaded onto the support. Further, the supports may include plural nesting, telescoping members so that the length of the support may be extended or contracted to provide an increased length when in its deployed position and then returned to its compact configuration when moved to its stowed position within the vehicle. In yet another variation, the support may be configured to slide relative to the fixed mount from its stowed position (e.g. within stationary mount) within the vehicle to an extended, but fixed deployed position. Thus, in any of the above, the supports remain generally stationary when patient transport apparatus 12 is loaded into the vehicle. Further, while the supports can provide cantilevered support of the transport apparatus when in their deployed positions, the supports do not provide support when in their stowed positions.

Additionally although described as being generally horizontal when in their deployed positions and also being stationary, the supports may move from an initial deployed position to a supporting position where the support fully supports the transport apparatus. For example, the support or a portion of the support may be deployed at an angle below horizontal when initially deployed and then raised to a horizontal supporting position where the support makes contact with and where it supports the transport apparatus. Further, the stationary mount may be movable in the vertical direction to adjust the height of the support while maintaining a pivot axis that is fixed with respect to the longitudinal axis of the vehicle. Alternately, the support may have a movable portion that translates linearly (i.e. lowers vertically downward) relative to the remaining portion of the support to facilitate loading of the transport apparatus onto the support, which thereafter returns to its aligned position with the remaining portion of the support when in its supporting configuration.

In yet another embodiment, the loading and unloading apparatus may include a second or secondary support 30 (see FIG. 2), with support 22 (or 122) forming a primary support. Second support 30 provides an auxiliary support to support primary support when support 22 (or 122) is moved to its deployed position. For example, the auxiliary support may be selectively movable between a stowed position and a deployed position so that when deployed, support 30 supports the distal end of the primary support (see FIG. 2). For example, in the case of support 22, each arm 22a, 22b may include an auxiliary arm.

As noted above, vehicle V may comprise an ambulance or other types of vehicles. The vehicle V may include a compartment with one or more doors D which define an access opening between them when moved to an open position. Optionally, the support may be coupled with the doors and configured to automatically deploy when the door or doors are opened. Furthermore, the support may include a restraint or coupler when in the stowed position for selectively engaging the patient transport apparatus to thereby form a restraint for the patient transport apparatus along at least two axes. Therefore, when combined with a latch, the patient transport apparatus can be securely fastened within the vehicle.

Accordingly, the present invention provides a method of moving a patient transport apparatus into a compartment of a vehicle through an access opening. The method includes deploying a support from the access opening about a fixed pivot axis. When deployed, the support is moved from a stowed position in which the support cannot support a patient transport apparatus to a deployed position in which the support has a receiving space into which the patient transport apparatus can be moved. Once the patient transport apparatus is moved into the receiving space, the patient transport apparatus can be supported by the support. After the patient transport apparatus is at least partially supported by the support, the patient transport apparatus can be moved at least partially in the compartment and thereafter the support may be returned to its stowed position. Additionally, after the patient transport apparatus is supported by the support, at least a portion of the patient transport apparatus may be collapsed into a more compact configuration for transfer into vehicle and thereafter transport by the vehicle.

Accordingly, a patient transport loading and unloading apparatus or system according to the present invention may provide a simplified construction that allows the apparatus or system to be retrofit into an existing vehicle and, further, optionally in a manner that could require a reduced capital investment.

We claim:

1. A patient transport loading and unloading apparatus for an emergency vehicle, the emergency vehicle having a patient compartment with a floor and an access opening into the patient compartment, said transport loading and unloading apparatus for loading a patient transport apparatus into the emergency vehicle, the patient transport apparatus having a patient support surface and a base movable relative to the patient support surface, the loading and unloading apparatus comprising:
    at least one support configured for mounting at the access opening; and
    a stationary mount, said support being mounted to and deployable relative to said stationary mount between a stowed position and a deployed position, and said support configured to support the patient transport apparatus when in said deployed position and remain generally stationary in said deployed position while the patient transport apparatus is fully loaded into the patient compartment from said support, wherein when the patient support apparatus is supported by said support, said support is configured to allow the base of the patient support apparatus to raise relative to the patient support surface without interference from said support.

2. The patient transport loading and unloading apparatus of claim 1, further comprising a loading and unloading apparatus base, said loading and unloading apparatus base including said stationary mount and being adapted to mount to the floor of the patient compartment.

3. The patient transport loading and unloading apparatus of claim 1, further comprising a latch at said loading and unloading apparatus base for anchoring the patient transport apparatus.

4. The patient transport loading and unloading apparatus of claim 1, wherein said support is pivotal relative to said stationary mount about a pivot axis fixed relative to said stationary mount.

5. The patient transport loading and unloading apparatus of claim 1, wherein said support comprises a pair of spaced apart arms, said arms defining a receiving space there between for receiving the patient support apparatus.

6. The patient transport loading and unloading apparatus of claim 5, wherein said loading and unloading apparatus base comprises a pair of spaced apart rails, said pair of spaced apart arms being mounted relative to said rails.

7. The patient transport loading and unloading apparatus of claim 6, said rails defining a space there between through which the patient transport apparatus may be moved when the patient transport apparatus is being loaded into the patient compartment.

8. The patient transport loading and unloading apparatus of claim 5, wherein each of said arms includes a guide surface on which the patient transport apparatus may be guided when at least a portion of the patient transport apparatus is moved into said receiving space.

9. The patient transport loading and unloading apparatus of claim 8, wherein said guide surfaces comprise recessed surfaces, each of said guide surfaces having a stop to limit movement of the patient transport apparatus along said arms, and optionally each of said stops comprising a spring biased pawl.

10. The patient transport loading and unloading apparatus of claim 9, wherein each of said arms includes a distal end, said stops being located at or adjacent said distal ends.

11. A patient transport loading and unloading system for an emergency vehicle, the emergency vehicle having a patient compartment with a floor and an access opening into the patient compartment, the patient transport loading and unloading system comprising:
    a patient transport apparatus having a patient support surface, a frame supporting said patient support surface, and a base movable relative to said frame;
    a patient transport loading and unloading apparatus, said patient transport loading and unloading apparatus including a support configured for mounting at the access opening; and
    a stationary mount, said support being mounted to and movable relative to said stationary mount between a stowed position and a deployed loading position, and when in said loading position said support having a support surface at a support height for supporting said patient transport apparatus thereon when said frame is at said support height and aligned with said support surface, and said support remaining in said loading position while said patient transport apparatus is fully loaded in the vehicle through the access opening, wherein when said patient support apparatus is supported on said support surface, said support is configured to allow said base of said patient support apparatus to raise relative to said frame without interference from said support.

12. The patient transport loading and unloading apparatus of claim 11, wherein said support comprises a pair of spaced apart arms, said arms defining a receiving space there between for receiving said patient support apparatus.

13. The patient transport loading and unloading system of claim 12, wherein said arms form a pair of said support surfaces, and said patient transport apparatus including a pair of support points outward of said frame for resting on said pair of arms and thereby supporting said patient transport apparatus on said arms.

14. The patient transport loading and unloading system of claim 13, wherein said patient transport apparatus includes a pair of couplers defining said supporting points for supporting said patient transport apparatus on said arms.

15. The patient transport loading and unloading system of claim 14, wherein said frame includes said couplers, and said couplers are movable between a deployed position for engaging a respective arm of said arms and a stowed position.

16. The patient transport loading and unloading system of claim 15, wherein each of said couplers is retracted into said frame when moved to said stowed position of said couplers.

17. The patient transport loading and unloading system of claim 14, wherein said couplers are movable to raise or lower said supporting points.

18. The patient transport loading and unloading system of claim 11, wherein said support is movable relative to said stationary mount about a fixed horizontal pivot axis wherein said support moves to a raised position when moved to said stowed position.

19. The patient transport loading and unloading system of claim 18, wherein said support is moved to a generally horizontal position when pivoted to said deployed position.

20. The patient transport loading and unloading system of claim 19, wherein said support is cantilevered from said stationary mount when moved to said deployed position.

21. The patient transport loading and unloading system of claim 19, wherein said support is pivotally mounted to said stationary mount about a horizontal axis wherein said support moves to a raised position when moved to said stowed position, and when in said stowed position said support forming a restraint for said patient transport apparatus at least along one direction.

22. The patient transport loading and unloading system of claim 21, wherein said support includes a releasable coupler when in said stowed position for selectively engaging said patient transport apparatus to thereby form a restraint for said patient transport apparatus in at least two directions.

23. The patient transport loading and unloading system of claim 11, further comprising a latch for anchoring said patient transport apparatus in the vehicle.

24. The patient transport loading and unloading system of claim 23, further comprising a loading and unloading base, said stationary mount formed on or mounted to said loading and unloading base, and said latch being formed on or mounted to said loading and unloading base.

25. The patient transport loading and unloading system of claim 11, wherein said support comprises a primary support, further comprising an auxiliary support for supporting a distal end of said primary support.

26. The patient transport loading and unloading system of claim 25, wherein said auxiliary support is selectively movable between a stowed position and a deployed position wherein said auxiliary support supports said distal end of said primary support.

* * * * *